United States Patent Office 3,763,274
Patented Oct. 2, 1973

3,763,274
TACKY LOW-TEMPERATURE CURING POLYISO-
CYANATE ADHESIVE COMPOSITION
Samuel Shan-Ning Wang, Cheshire, and Donald Francis
Rossler, Monroe, Conn., assignor to American Cyan-
amid Company, Stamford, Conn.
No Drawing. Filed Jan. 4, 1972, Ser. No. 215,408
Int. Cl. C08g 41/04, 22/12, 22/16
U.S. Cl. 260—858                                    7 Claims

ABSTRACT OF THE DISCLOSURE

A tacky adhesive composition which cures at room temperature to strong, adhesive, and flexible state is obtained when (1) a normally solid polyol-arylene-diisocyanate prepolymer carrying at least three isocyanato substituents; (2) a normally solid linear prepolymer composed of polyester and polyurethane linkages and carrying two terminal alcoholic —OH substituents; (3) a saturated polyol having a molecular weight in excess of 2,000 and having an average content of at least three alcoholic —OH substituents per molecule; and (4) a difunctional monomeric curing agent for the components of said composition which carry isocyanato substituents, the functional groups of said agent being separated by at least 4 carbon atoms; are mixed when approximately equivalent reactive ratio.

---

The present invention relates to adhesive compositions which provide a strong tacky bond in uncured state in an assembly when applied to only one of the surfaces to be joined, and which cure, if deisred, at room temperature to provide strong, flexible, water-, gasoline- and heat resistant bonds. The invention includes wood, aluminum, copper, glass, ceramic, synthetic, plastic and other common substrate surfaces bonded together with this adhesive.

The manufacture of aircraft fuselages and wings is currently performed by cutting aluminum honeycomb into appropriate shapes and cementing an appropriately cut sheet of aluminum or stainless steel to each side. The metal honeycomb structure between the two cemented sheets gives the assembly great rigidity. In similar manner it is common practice to use adhesives in the fabrication of manufactures from interfitting metal and synthetic organic plastics. Manufactures of this type include automobile dashboard assemblies, household appliances, office machines, surgical instruments, electronic equipment, tableware, and jewelry. For these purposes, it is desirable that the adhesive be self-wetting (so that it need be applied to only one of the surfaces to be joined), that it have strong adhesive properties in uncured state (so that the parts can be accurately assembled together), that it cure to thermoset state at room temperature under only light pressure, that the bond be elastomeric (i.e., not subject to brittle failure), and that the bond be resistant to water, to gasoline and to elevated temperature.

The discovery has now been made that the foregoing requirements are substantially met by a composition which consists essentially of a homogeneous mixture of (1) a thermostable normally solid polyol-toluenediisocyanate prepolymer containing at least three isocyanato substituents; (2) a normally solid linear hydroxyl-terminated prepolymer composed of polyester and polyurethane linkages; (3) a saturated polyol having an average content of at least three alcoholic —OH substituents per macromolecule; (4) a difunctional coupling agent for isocyanato compounds, the functional groups in said agent being separated by at least 4 carbon atoms, the OH equivalent functionality of said coupling agent being between 25% and 75 of the equivalent of isocyanato substituents present. All of the foregoing components are thermostable and are soluble to the extent of at least 10% in a common organic solvent, and have a molecular weight less than 20,000. The term "thermostable" means that the compounds do not decompose or self-interact in one hour in an inert atmosphere at 300° F.

In commercial use, component (1) is kept separate from components (2–4) until the adhesive is needed, but components (2–4) can be and preferably are premixed. In the latter event, component (1) is mixed in the appropriate proportion with the premix of components (2–4), a volatile solvent being added as desired to adjust the viscosity of the mixture to a convenient level in view of the temperature of the substrate to which the composition will be applied and the surface characteristics of the substrate.

The components are mixed so that the ratio of the molar functionality of component (1) to the sum of the molar functionalities of components (2–4) is between about 1:2 and 2:1. A strongest bond seems to develop with shortest setting time when the ratio of the molar functionality of component (1) to the molar functionalities of components (2–4) is about 1:1.

The adhesive need be applied to only one of the surfaces to be joined. When the two surfaces are pressed together, wetting of the other surface with the adhesive takes place automatically.

The adhesive is applied in sufficient quantity so that a film of customary thickness (e.g., a film 0.001″–0.01″ thick) remains after evaporation of the solvent, after which the assemblies can be cured if desired in customary manner.

The strongest bond develops when the solvent is allowed to evaporate before the surfaces to be joined are placed in contact. Preferably, then the solvent is allowed to evaporate, after which the surfaces to be joined are pressed together with firm pressure to level off any irregularities in the adhesive film. A strong bond forms at once, which stabilizes the relative positions of the two elements of the assembly. If desired, during the first few minutes the surfaces can be separated and repositioned without harm to the ultimate bonding strength of the adhesive.

The parts to be joined are kept pressed together until the adhesive has set, that is, until the rate at which the adhesive increases in bonding strength becomes negligibly slow. The pressure needed for this purpose need not be in excess of the amount needed to maintain the substrates in close contact. A pressure of 1 lb./in.$^2$ of surface is generally sufficient for the purpose.

The adhesive sets satisfactorily at room temperature. The speed with which the adhesive sets increases as the temperature rises, and in the temperature range of 150° F.–212° F. the adhesive sets within a few hours.

The compositions of the present invention can be prepared from a large number of materials all of which are commercially available.

The proportion of the components of the adhesive composition, as prepared and before chemical interaction has begun, is predetermined so that the ratio of the number of isocyanato (—NCO) substituents to the number of substituents which are reactive therewith in the mixture is between 2:1 and 1:2. In practice a ratio of about 1:1 is preferred, because this ratio assures the most efficient utilization of the reactive substituents from the chemical point of view and thereby results in formation of a joint possessing best strength.

Materials suitable for use as component (1) can be prepared by reacting a water-soluble polyol substantially completely with an equimolecular proportion of a benzene-soluble arylene diisocyanate to the extent of one of the functionalities of the arylene diisocyanate so that the product contains three or more reactive isocyanato substituents per molecule. The product is thermostable and normally solid and is soluble in benzene. The polymer contains the characterizing groups

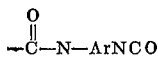

which are substituents of alcohols carrying substantially no isocyanate-reactive substituents.

In place of trimethylolpropane, castor oil, glycerol, 1,2,6-hexanetriol, and the lower condensates of ethylene oxide, propylene oxide, butylene oxide and tetrahydrofurane with ethanol, glycol, glycerol, and similar mono- and polyols can be used for the preparation of component (1).

Materials suitable for the preparation of component (2) are the polyesters formed by reacting a lower water-soluble acid (for example, 1 mol of adipic acid) with a water-soluble glycol (for example, propylene glycol), the glycol being employed in excess (e.g., 1.2 to 1.5 mols) so that the resulting polyester carries a hydroxyl substituent at each end. The polyester (which is a glycol) is then reacted with about ¼–½ mol of an arylene diisocyanate per hydroxyl substituent present, so as to obtain a low molecular weight prepolymer composed of polyester, and polyurethane linkages and carrying a hydroxyl substituent at each end. The product thus is a glycol of low molecular weight and has a molecular weight less than about 10,000.

Materials suitable for use as component (3) are saturated polyhydroxy polyester resins having a molecular weight such that they are liquid and have a hydroxyl number of 150 to 200 and a functionality (hydroxy substituents per macromolecule) of 3 to 7. Suitable materials of this type can be prepared by reacting a water-soluble dibasic acid, for example, adipic acid, with an appropriate excess of glycerol, pentaerythritol or other similar polyol.

Materials suitable for use as component (4) include essentially monomeric difunctional amines, alcohols, and amino-alcohols, for example, N,N'-di sec. butyl-p-phenylenediamine, N,N'-di(1,4-dimethylpentyl)-p-phenylenediamine, p,p' - di - 2-(2-hydroxyethoxy)-diphenyldimethylmethane, p,p' - di - (2-hydroxyethylamino)octachlorobiphenyl, and p,p'-di-(2-hydroxyethoxyethoxy)octachlorobiphenyl.

In place of the toluene diisocyanate used for the preparation of certain of the components described above the following arylenediisocyanates and alkylenediisocyanates may be employed with substantially the same results:

4,4'-diphenylmethane diisocyanate
1,6-hexamethylene diisocyanate
1,5-naphthalene diisocyanate
diansidine diisocyanate
tolidine diisocyanate
xenylene diisocyanate The viscosity of the adhesive compositions of the present invention can be decreased by the addition of one or more volatile solvents. Suitable such solvents include acetone, methyl ethyl ketone, ethyl acetate, benzene, toluene, methylene chloride, and trichloroethylene. The desired solvent or solvents is preferably incorporated into the premix of components (2–4). Component (1) is then mixed into the composition immediately before use. If desired, the solvent may be premixed with component (1), or the solvent may be added when all the components are mixed together.

The adhesive compositions of the present invention can contain other materials customarily present in structural adhesive compositions. These include fillers (for example, silica powder and powdered walnut shells) which increase the bulk of the composition and provide a harder bond without significant detriment to the bonding strength of the adhesive; inert pigments (for example, titanium dioxide, monastral fast blue, carbon black, graphite powder) and inert benzene-soluble dyes to permit the adhesive to be distinguished from the substrate; flow promotors such as cellulose acetobutyrate; and agents which improve the resistance of the composition to water such as gamma-glycidoxypropyl trimethoxy silane.

The invention is more particularly illustrated by the examples which follow. These examples are preferred embodiments of the invention and are not to be construed in limitation thereof.

EXAMPLE 1

The following illustrates the preparation of an adhesive composition according to the present invention.

The composition is prepared from the following materials.

Component (1)

A polyisocyanato polyol-toluenediisocyanate prepolymer having the formula:

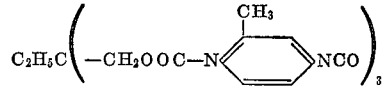

This is prepared by condensing 1 mol of a polyol of the formula $C_2H_5C(-CH_2OH)_3$ with 3 mols of toluenediisocyanate. It is known commercially as "RD–345–B" and is sold by Trancoa Chemical Co.

Component (2)

The solid hydroxyl-terminated linear polyurethane prepolymer having the formula:

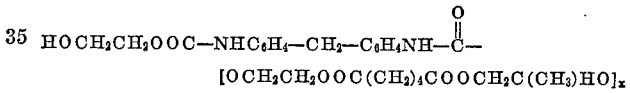

This is prepared by condensing 2 mols of adipic acid with a 50:50 by weight mixture of 1.71 mol of ethylene glycol and 1.14 mol of propylene glycol at 140° C.–200° C. (glycol being returned as evaporated), until substantially all the adipic acid has reacted, and then reacting 200 g. of the product (having a molecular weight of about 2,000–3,000) with sufficient methylene (bis(4-phenylisocyanate) to provide a product which has a viscosity of 1.0 to 1.5 centipoises as a 0.5% solution in dimethyl formamide at 30° C. A variety of other suitable agents can be prepared by methods disclosed in Preparative Methods of Polymer Chemistry (New York, 1961) by W. R. Sorenson and T. W. Campbell.

Component (3)

This is an adipic acid-glycol-glycerol polyester product. It has a molecular weight of 2,400, and a hydroxyl number of 170 and contains 4.9 alcoholic —OH substituents per macromolecule.

Component (4)

N,N'-bis-(1,4-dimethylpentyl)-p-phenylenediamine having the theoretical formula:

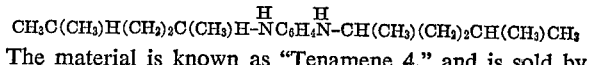

The material is known as "Tenamene 4," and is sold by Eastman Chemical Co.

The components are mixed in the following proportions:

| Component | Grams | Equivalent functionalities | |
|---|---|---|---|
| | | —NCO | —OH |
| Number: | | | |
| 1 | 52.0 | 0.13 | |
| 2 | 200.0 | | Negligible |
| 3 | 26.4 | | 0.80 |
| 4 | 8.2 | | 0.054 |
| Totals | 286.6 | 0.13 | 0.134 |

Sufficient ethyl acetate is added to reduce the mix to spreadable viscosity. The mixture is tinted white by addition of an inert pigment (titanium dioxide).

EXAMPLE 2

The procedure for the preparation of the composition of Example 1 is repeated except that the "Tenamene 4" is replaced by 8.5 g. of diethoxylated bisphenol A having the theoretical formula:

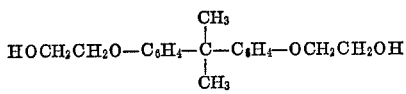

EXAMPLE 3

The procedure for the preparation of the composition of Example 1 is repeated except that the amount of component (3) is decreased to 13.2 g. and component (4) is replaced by 22.0 g. of bis-p,p'-(2-hydroxyethylamino) octachlorobiphenyl, $$HOCH_2CH_2-NH-C_6Cl_4-C_6Cl_4-NH-CH_2CH_2OH,$$

prepared by reacting 1 mol of octachlorobiphenyl with 2 mols of ethanolamine (sold as Ugine Diol 111 by Ugine Industries, Inc.).

EXAMPLE 4

The adhesive strengths of the composition of Examples 1-3 are determined as follows:

Green tack.—This property [initial (uncured) adhesive strength] is determined by coating a 1" x 6" x ¾" plywood strip with the composition, placing over the strip a strip of washed and cleaned aircraft grade aluminum 1" x 6" x 0.01" thereover, maintaining the assembly at room temperature (20° C.) for one hour under a pressure of 1 lb./in.² to level off irregularities in the adhesive film, and measuring the force needed to peel the aluminum strip from the wood.

Cure peel strength.—The test is repeated on an assembly prepared in the same manner but maintained at room temperature for 7 days, in which time the adhesive develops substantially all its adhesive strength.

Cured lap shear strength.—This is determined by coating 3" of three 1" x 6" x 0.01" strips of washed and cleaned aircraft grade aluminum with the adhesive, placing 3" of a similar sheet of aluminum over each of the coated sheets so as to form a set of three lap jointed sheets, maintaining the sheets under a pressure of 10 lb./in.² for 7 days at room temperature to form joints bonded with the adhesive in cured state, and then measuring the pull needed to shear the adhesive in the joints at room temperature, at 200° F. and at 300° F. Results are as follows:

| Test | | Example No. | | |
|---|---|---|---|---|
| No. | Description | 1 | 2 | 3 |
| 1 | "Green" tack (pull to peel, lb./in. of width) | 16 | 16 | 28 |
| 2 | Adhesion after cure (pull to peel, lb./in. of width) | 30 | 30 | 40 |
| 3 | Shear strength after cure (lb./in.² of lap): | | | |
| | At room temp | 750 | 600 | 800 |
| | At 200° F | 408 | 195 | 380 |
| | At 300° F | 232 | 110 | 300 |

The results show that the composition of the present invention possesses a strong adhesiveness in uncured state, that when cured at room temperature the composition develops adhesion and shear strength values which are excellent at room temperature, and that the shear strength values remain high when the joints are heated at 200° F. and 300° F.

The bond strength values do not change when the joints are soaked in water and in gasoline for 24 hours at room temperature.

EXAMPLE 5

The following illustrates the preparation of a two-component adhesive system (both components being liquid) which when mixed forms an adhesive composition according to the present invention.

| | G. |
|---|---|
| (1) 75% by weight solution of component (1) of Example 1 in ethyl acetate | 52.0 |
| (2) Component (2) of Example 1 | 200.0 |
| (3) Component (3) of Example 1 | 13.2 |
| (4) Component (4) of Example 3 | 22.0 |
| (5) 50% by weight solution of Epon 834 (diglycidyl bisphenol A) in methyl ethyl ketone | 3.6 |
| (6) Gamma-glycidylpropyl trimethoxy silane (Silane 187) | 0.6 |
| (7) 20% solution of cellulose acetobutyrate in water | 4.5 |
| (8) Methyl ethyl ketone (H₂O-free) | 51.7 |
| (9) Amorphous silica powder (Insil A-10) | 150.0 |
| (10) Inert soluble dye (Calco Red ZMQ) | Trace |
| Total | 497.6 |

The components (1) and (2-9) are storage-stable at 40° C. and may be packaged in squeeze tubes. Component (1) and a mixture of components (2-10) are easily mixed in 1:9 weight ratio to form a viscous syrup which does not drip when applied to the underside of the surface. When spread as a thin coating to a flat surface and the solvents are allowed to evaporate, another flat surface (uncoated) placed thereover adheres with tenacity thereto. The composition sets to cured state in 24 hours at room temperature and develops a bond which possesses high strength at room temperature and at temperatures up to 400° C.

EXAMPLE 6

A composition is prepared according to Example 5, except that 12.6 g. of diethoxylated bisphenol A, $$HOCH_2CH_2O-C_6H_4-C(CH_3)_2-C_6H_4O-CH_2CH_2OH,$$

(CX-2635.1 of Dow Chemical Co.) is employed in place of the Tenamene 4 of Example 4. A similar adhesive composition is obtained.

EXAMPLE 7

The procedure for the preparation of the composition of Example 5 is repeated except that component (4) is 9.7 g. of N,N'-diisobutyl-p,p'-phenylenediamine. A similar adhesive is obtained.

EXAMPLE 8

The procedure for the preparation of the composition of Example 5 is repeated except that component (4) is 12.1 g. of N,N-bis(1,4-dimethylpentyl)-p,p'-phenlenediamine. A similar adhesive is obtained.

EXAMPLE 9

The procedure of Example 5 is repeated except that component D is replaced by 26.8 g. of p,p'-2-(2-hydroxyethoxy)-ethoxy decachlorobiphenyl having the formula

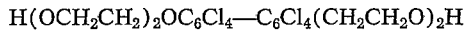

(known as Diol XO2A and sold by Ugine Industries). A similar adhesive is obtained.

We claim:
1. A tacky adhesive homogeneous composition which possesses "green" tack of about 16 to about 28 lb. per inch peel strength and which cures at room temperature to a strong adhesive and flexible state, consisting essentially of (1) a normally solid polyolarylenediisocyanate prepolymer carrying at least three isocyanato substituents; (2) a normally solid linear prepolymer composed of polyester and polyurethane linkages and carrying two terminal alcoholic —OH substituents; (3) a saturated polyol having a molecular weight in excess of 2,000 and having an average content of at least three alcoholic —OH substituents per molecule; and (4) a difunctional monomeric amine, alcohol, or amino-alcohol curing agent for the components of said composition which carry isocyanato substituents, the functional groups of said agent being separated by at least 4 carbon atoms; the equivalent ratio of the isocyanato substituents to the alcoholic hydroxyl substituents of said composition being between 2:1 and 1:2; each of the components of said composition being soluble in a common volatile organic liquid to the extent of at least 10% by weight and being thermostable, and having a molecular weight less than 20,000.

2. A composition according to claim 1 of spreadable viscosity resulting from a uniformly distributed content of volatile mutual solvent for the components of said composition.

3. A composition according to claim 1 wherein the polyisocyanate prepolymer is the reaction product of one mol of trimethylolpropane with three mols of toluene diisocyanate.

4. A composition according to claim 1 wherein component (3) is a glycol-glycerol adipate each terminus of which carries an alcoholic —OH substituent.

5. A composition according to claim 1 wherein component (4) is bis-p,p'-(2-hydroxyethylamino)octachlorobiphenyl.

6. An assembly consisting essentially of at least two shaped surfaces bonded together by a film of a composition according to claim 1 in hard not-tacky cured state.

7. An assembly according to claim 6 wherein the surfaces are aluminum.

References Cited

UNITED STATES PATENTS

| | | | |
|---|---|---|---|
| 3,202,728 | 8/1965 | Kohn | 260—858 |
| 3,437,622 | 4/1969 | Dahl | 260—24 |
| 3,309,261 | 3/1967 | Schiller et al. | 161—190 |
| 3,666,835 | 5/1972 | Schloss | 260—858 |
| 2,769,826 | 11/1956 | Yoho | 260—407 |
| 3,075,927 | 1/1963 | Lanham | 260—2.5 |
| 3,264,268 | 8/1966 | Muller et al. | 260—77.5 |

DONALD E. CZAJA, Primary Examiner

H. S. COCKERAM, Assistant Examiner

U.S. Cl. X.R.

161—190; 260—18 TN, 37.2, 37.8, 33.6, 33.8, 37 N

UNITED STATES PATENT OFFICE
CERTIFICATE OF CORRECTION

Patent No. 3,763,274                Dated October 2, 1973

Inventor(s) SAMUEL SHAN-NING WANG and DONALD FRANCIS ROSSLER

It is certified that error appears in the above-identified patent and that said Letters Patent are hereby corrected as shown below:

Column 2 line 2.   After "75" insert -- % --.
Column 4 line 36.  After "]$_x$" and before "." insert -- H --;
Column 4 line 44.  After "methylene" and before "bis" delete -- ( --.

Signed and sealed this 23rd day of April 1974.

(SEAL)
Attest:

EDWARD M. FLETCHER, JR.            C. MARSHALL DANN
Attesting Officer                  Commissioner of Patents